(12) United States Patent
Tonosaki et al.

(10) Patent No.: US 6,709,605 B2
(45) Date of Patent: Mar. 23, 2004

(54) ETCHING METHOD

(75) Inventors: Minehiro Tonosaki, Kanagawa (JP); Koji Kitagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 118 days.

(21) Appl. No.: 10/036,994

(22) Filed: Dec. 21, 2001

(65) Prior Publication Data
US 2002/0106904 A1 Aug. 8, 2002

(30) Foreign Application Priority Data

Dec. 26, 2000 (JP) .................................... P2000-394339

(51) Int. Cl.$^7$ .................................................. C08J 7/02
(52) U.S. Cl. .............................. 216/2; 216/83; 216/84; 216/87
(58) Field of Search ........................... 216/2, 83, 84, 216/87

(56) References Cited

U.S. PATENT DOCUMENTS

| | | | | |
|---|---|---|---|---|
| 3,852,134 A | * | 12/1974 | Bean | 216/87 |
| 4,068,018 A | * | 1/1978 | Hashimoto et al. | 430/5 |
| 5,296,090 A | * | 3/1994 | Solares et al. | 216/87 |
| 6,139,716 A | * | 10/2000 | McCarthy et al. | 205/665 |

FOREIGN PATENT DOCUMENTS

DE 3623261 A1 * 1/1988 ........... B29D/31/00

* cited by examiner

Primary Examiner—Anita Alanko
(74) Attorney, Agent, or Firm—Sonnenschein, Nath & Rosenthal LLP

(57) ABSTRACT

Provided is an etching method of accurately forming a fine structure in a plastic substrate. A surface reformed layer insoluble by an etchant, for example, limonene is formed on a surface of a substrate soluble by the etchant by ion implantation treatment; an opening is formed in the surface reformed layer by dry etching treatment; and the substrate is subjected to wet etching treatment by dipping the substrate in the etchant. A peripheral portion, around the opening, of the surface reformed layer functions as a mask to allow the wet etching to anisotropically proceed, and a portion, on the side opposed to the opening, of the surface reformed layer functions as an end point of the wet etching. As a result, a recess having a uniform inner diameter in the depth direction can be formed in the substrate.

26 Claims, 14 Drawing Sheets

ETCHING METHOD

RELATED APPLICATION DATA

The present application claims priority to Japanese Application(s) No(s). P2000-394339 filed Dec. 26, 2000, which application(s) is/are incorporated herein by reference to the extent permitted by law.

BACKGROUND OF THE INVENTION

The present invention relates to an etching method for forming a fine structure in a plastic substrate.

Plastic working has been generally performed by a molding technique using a mold, or a physically cutting technique which makes use of cutting, etching, or sandblast. According to such a plastic working technique, for example, a plastic substrate can be formed into a desired shape.

The above-described related art plastic working technique, however, has a problem that it is difficult to accurately work a plastic substrate. The reason for this is as follows: namely, for example, in the case of forming a fine structure such as a recess, which has a circular opening shape of an inner diameter of 1.0 mm or less, in a plastic substrate, there occurs a variation in inner diameter of the recess in the depth direction because the working accuracy of the related art plastic working technique is insufficient to form a fine structure. This becomes significant, particularly, in the case of forming a fine recess having a depth being twice or more an inner diameter.

SUMMARY OF THE INVENTION

An object of the present invention is to provide an etching method capable of accurately forming a fine structure in a plastic substrate.

To achieve the above object, according to an aspect of the present invention, there is provided an etching method including: a first step of subjecting a plastic substrate to ion implantation treatment, to reform a surface of the plastic substrate, thereby forming a surface reformed layer; and a second step of subjecting the plastic substrate to wet etching treatment using a specific etchant by determining an end point of the wet etching treatment with the use of the surface reformed layer.

With this configuration, at the time of wet etching treatment, an etching range can be controlled by the surface reformed layer. Accordingly, unlike the related art plastic working using a molding technique or a cutting technique, a fine structure can be accurately formed in a plastic substrate. Further, since an etching direction (anisotropic or isotropic direction) at the time of wet etching treatment can be controlled, various kinds of micro-machines can be each formed by using such a plastic substrate having a fine structure.

In this method, preferably, a solution, which can dissolve a layer to be etched in the second step and cannot dissolve the surface reformed layer, is used as the etchant, or a solution, which has a high selection ratio of etching of a layer to be etched in the second step at least to etching of the surface reformed layer, is used as the etchant.

Preferably, limonene is used as the etchant. With this configuration, it is possible to shorten a time required for etching, and to eliminate a problem associated with an environmental contamination of waste of the etchant.

Preferably, the second step is carried out in an ultrasonic environment.

Preferably, the etching method further includes a third step of forming a specific thin film on the surface reformed layer, the third step being inserted between the first step and the second step.

With this configuration, it is possible to obtain a plastic substrate in which a fine structure provided with a specific thin film is accurately formed.

DETAILED DESCRIPTION OF THE PREFERRED EMBODIMENTS

Hereinafter, embodiments of the present invention will be described in detail with reference to the drawings.

[First Embodiment]

A configuration of a treatment apparatus used for an etching method according to a first embodiment of the present invention will be described with reference to FIG. 1. This treatment apparatus can be mainly used to form a fine structure in a plastic substrate by subjecting the plastic substrate to ion implantation treatment, film formation treatment, and etching treatment.

<Configuration of Treatment Apparatus>

Figure 1:
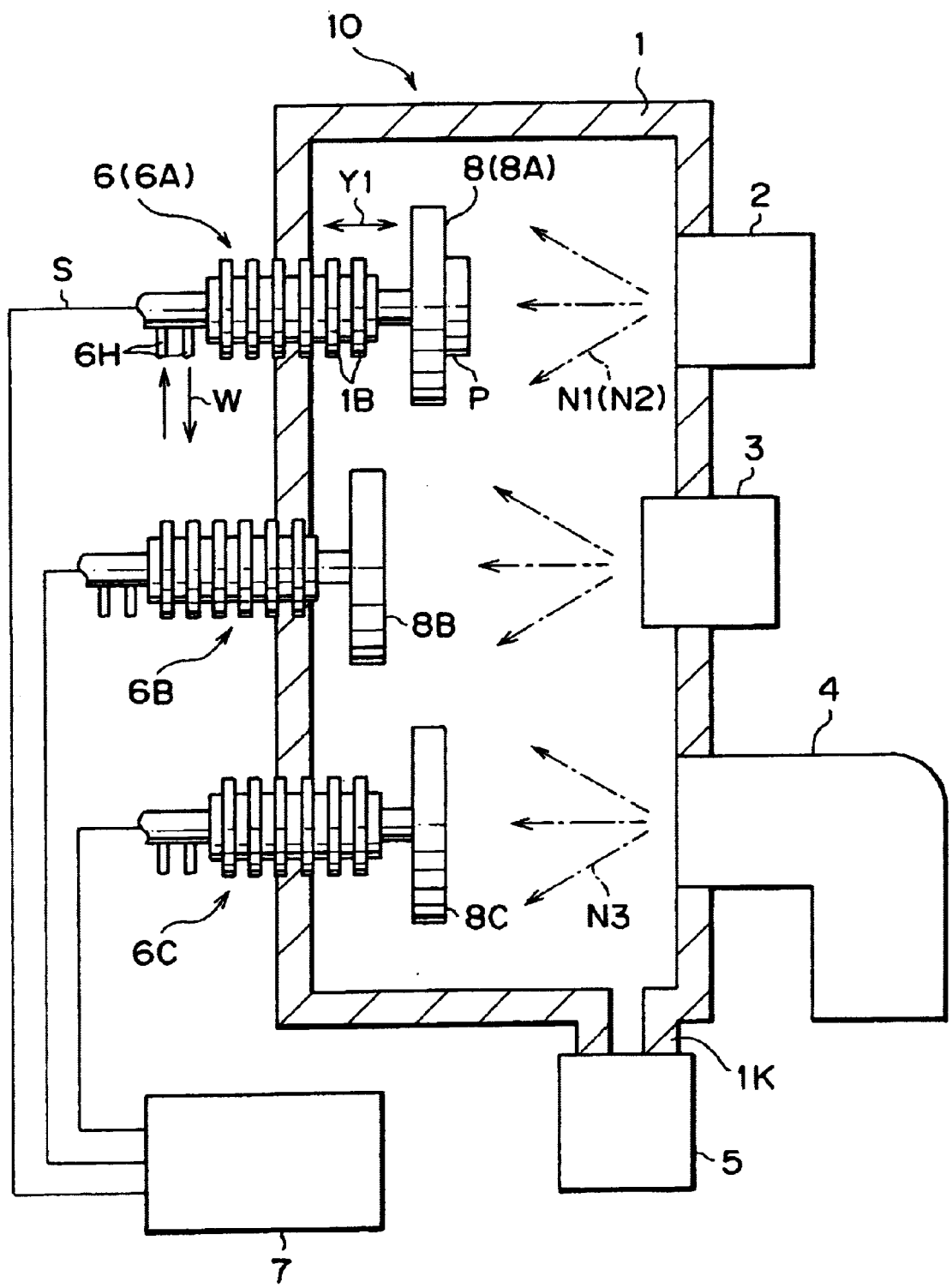
FIG. 1 is a view showing one example of configuration of a treatment apparatus used for an etching method according to a first embodiment of the present invention.

FIG. 1 shows a configuration of a treatment apparatus 10. The treatment apparatus 10 typically includes a vacuum chamber 1 made from a metal or the like; a plurality (for example, three) of treatment sources 2, 3 and 4 mounted to the vacuum chamber 1 in such a manner as to pass through a wall surface of the vacuum chamber 1; a vacuum pump 5 connected to the vacuum chamber 1 via an exhaust pipe 1K; a plurality (for example, three) of introducing terminals 6 (6A, 6B and 6C) disposed so as to correspond to the treatment sources 2, 3 and 4, respectively, with their one-end portions being inserted in the vacuum chamber 1; and a bias power supply 7 connected to the introducing terminals 6 via wiring lines S for applying a bias voltage to each of the introducing terminals 6. The one-end portions, inserted in the vacuum chamber 1, of the introducing terminals 6 (6A, 6B and 6C) are joined to a plurality (for example, three) of substrate holders 8 (8A, 8B and 8C), respectively. A substrate P to be treated is mounted on the substrate holder 8. To be more specific, the substrate P is movable at any time between two of the substrate holders 8A, 8B and 8C by means of a moving arm (not shown). A state that the substrate P is mounted on the substrate holder 8A is shown in FIG. 1.

The treatment source 2 is typically configured as a Kaufman-type ion source, which is mainly used to implant specific ions in the substrate P so as to reform a surface of the substrate P, thereby forming a surface reformed layer 21 to be described later with reference to FIG. 3, and is also used to etch the substrate P. At the time of ion implantation treatment, the treatment source 2 generates, in the vacuum chamber 1, a plasma containing ions to be implanted in the substrate P (hereinafter, referred to as "implantation ions") by using a specific gas (working gas) capable of producing the implantation ions. At the time of etching treatment, the treatment source 2 generates, in the vacuum chamber 1, a plasma containing ions required for etching (hereinafter, referred to as "etching ions") by using a specific gas (etching gas) capable of producing the etching ions. As the working gas, nitrogen gas, hydrogen gas, methane gas, or the like is used, and as the etching gas, oxygen gas or the like is used. The kind of treatment (ion implantation treatment or etching treatment) performed by the treatment source 2 is determined, for example, by a value of a bias voltage to be applied from the bias power supply 7 to the treatment source 2.

The treatment source 3 is typically configured as a DC (Direct Current) sputter source, which is mainly used to form, at the time of formation of various macro-machines on the substrate P, an electrode or the like on the surface of the substrate P by film formation treatment.

The treatment source 4 is typically configured as a FCVA (Filtered Cathodic Vacuum Arc) ion source, which is mainly used to form a thin film made from a specific material on a surface of the substrate P having been subjected to ion implantation treatment (that is, on which the surface reformed layer 21 has been formed). The FCVA ion source is a general-purpose cathodic arc source provided with an electromagnetic filter for removing droplets generated by melting of a cathode. The treatment source 4 has a cathode composed of a high density carbon rod as an ion source, wherein the cathode is evaporated by making use of an energy of arc discharge generated by a striker trigger electrode, to generate carbon ions in the vacuum chamber 1. Unlike the Kaufman type ion source requiring a working gas to generate ions, the treatment source 4 can generate ions without use of any working gas, that is, can generate ions while keeping a high vacuum state. As the cathode material, in place of the above-described carbon, a ceramic material, or a metal such as tungsten (W), tantalum (Ta), silicon (Si), nickel (Ni), chromium (Cr), aluminum (Al), titanium (Ti), or copper (Cu) can be used.

The vacuum pump 5 is typically configured as a turbomolecular pump, which is mainly used to exhaust a gas (for example, air) filled in the vacuum chamber 1 through the exhaust pipe 1K for evacuating the interior of the vacuum chamber 1 to a specific vacuum state.

The introducing terminals 6 (6A, 6B and 6C) are typically configured as general-purpose introducing terminals, which are movable in the direction Y1 in the figure in accordance with, for example, treatment conditions for the treatment sources 2, 3 and 4. Piping 6H for circulating a coolant is assembled in each of the introducing terminals 6, wherein a coolant W is circulated in the introducing terminal 6 through the piping 6H so as to cool the substrate P mounted on the substrate holder 8. Each introducing terminal 6 is made from a conductive material such as a metal, and is supported by a supporting member 1B provided on the vacuum chamber 1. The supporting member 1B is made from an insulating material such as a ceramic material, so that each introducing terminal 6 is electrically isolated from the vacuum chamber 1 via the supporting member 1B.

The bias power supply 7 is used to apply a pulse voltage including a positive pulse voltage and a negative pulse voltage to the substrate P mounted on the substrate holder 8. When a negative pulse voltage is applied from the bias power supply 7 to the substrate P, ions of each kind in a plasma generated in the vacuum chamber 1 are attracted to the substrate P, whereby the substrate P is subjected to each treatment (ion implantation treatment, film formation treatment, or etching treatment). It is to be noted that characteristics of the pulse voltage, such as a pulse peak value (pulse height), a pulse rising time, a pulse interval, and a pulse width can be adjusted independently for each of the introducing terminals 6 (6A, 6B and 6C) by the bias power supply 7.

The substrate holders 8 (8A, 8B and 8C) are each used for holding the substrate P and made from a conductive material such as a metal, like the introducing terminals 6. The substrate P is typically formed into a disk or rectangular shape. The substrate P is made from a plastic material, examples of which may include amorphous polyolefin (APO), polycarbonate (PC), polymethyl methacrylate (PMMA), polyethylene terephthalate (PET), acrylonitrile Butadiene styrene copolymer (ABS), polyacetal (POM), polytetrafluoroethylene (PTFE), nylon 6, and polyethylene.

The treatment apparatus 10 further includes, in addition to the above-described series of components, a microcomputer for controlling the treatment apparatus 10 as a whole, gas vessels for supplying various gases to the treatment source 2 and the like, and a drive unit connected to the other end portions, projecting outwardly from the vacuum chamber 1, of the introducing terminals 6 for moving the introducing terminals 6. The treatment apparatus 10 can be used not only for treatment of the substrate P made from an insulating material (plastic material) but also for treatment of the substrate P made from a conductive material such as a metal. For treatment of the substrate P made from a conductive material, only a negative pulse voltage is applied from the pulse power supply 7 to the substrate P.

<Etching Method>

Figure 2:
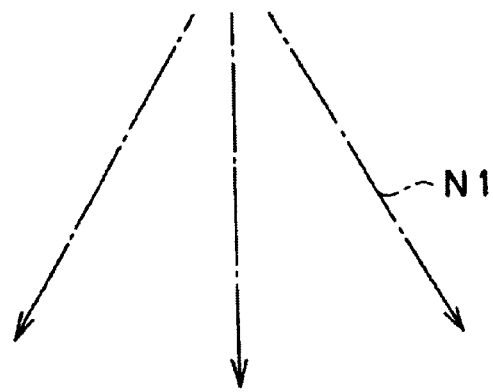
FIG. 2 is a view illustrating an ion implantation treatment step.
Figure 2:
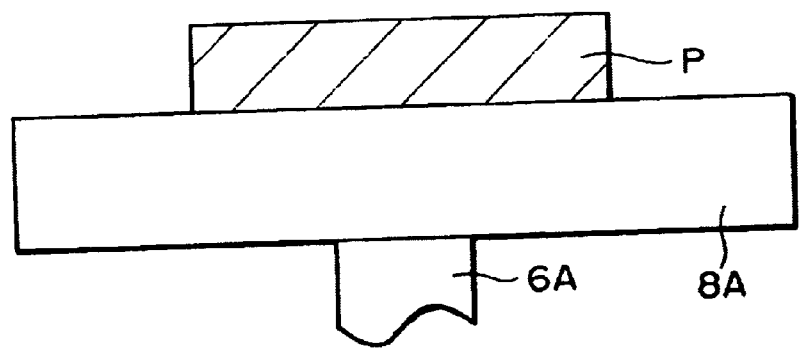
Figure 5:
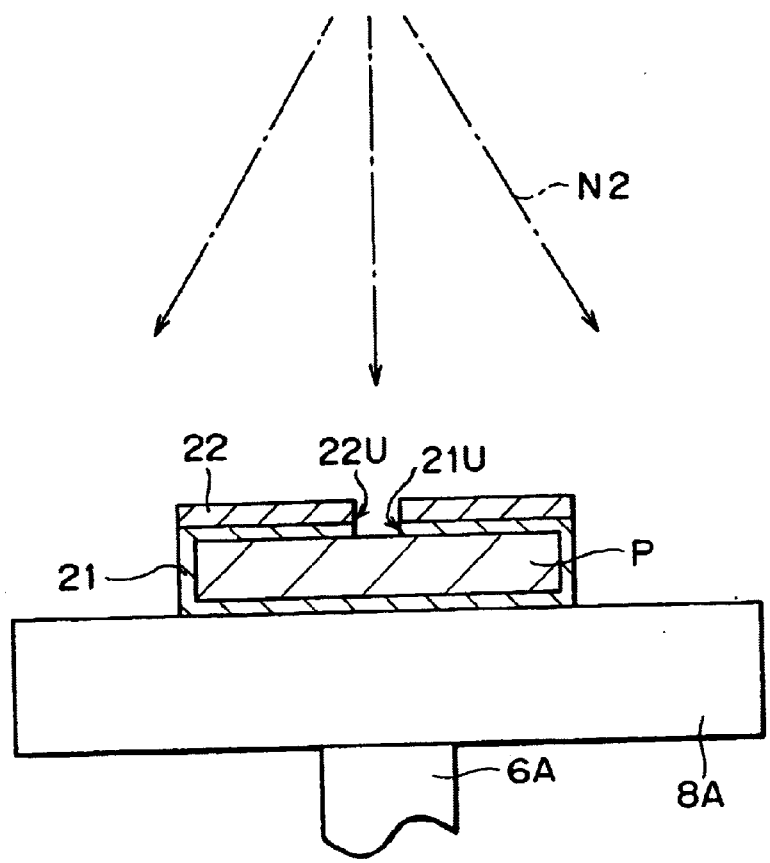
FIG. 5 is a view illustrating a step subsequent to the step shown in FIG. 4.
Figure 6:
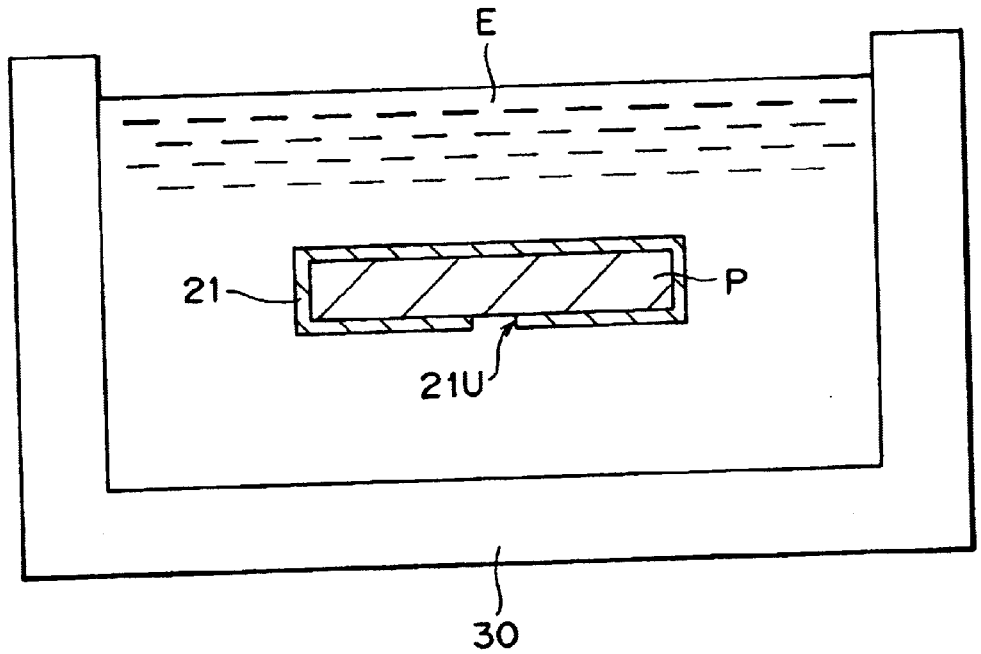
FIG. 6 is a view illustrating a wet etching treatment step.
Figure 7:
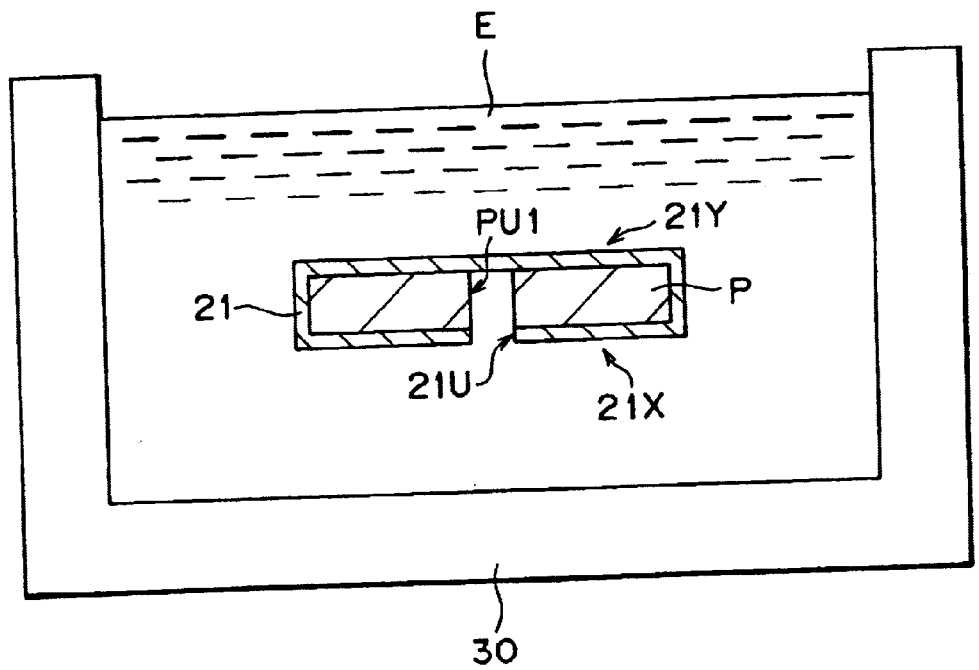
FIG. 7 is a view illustrating a step subsequent to the step shown in FIG. 6.
Figure 8A:
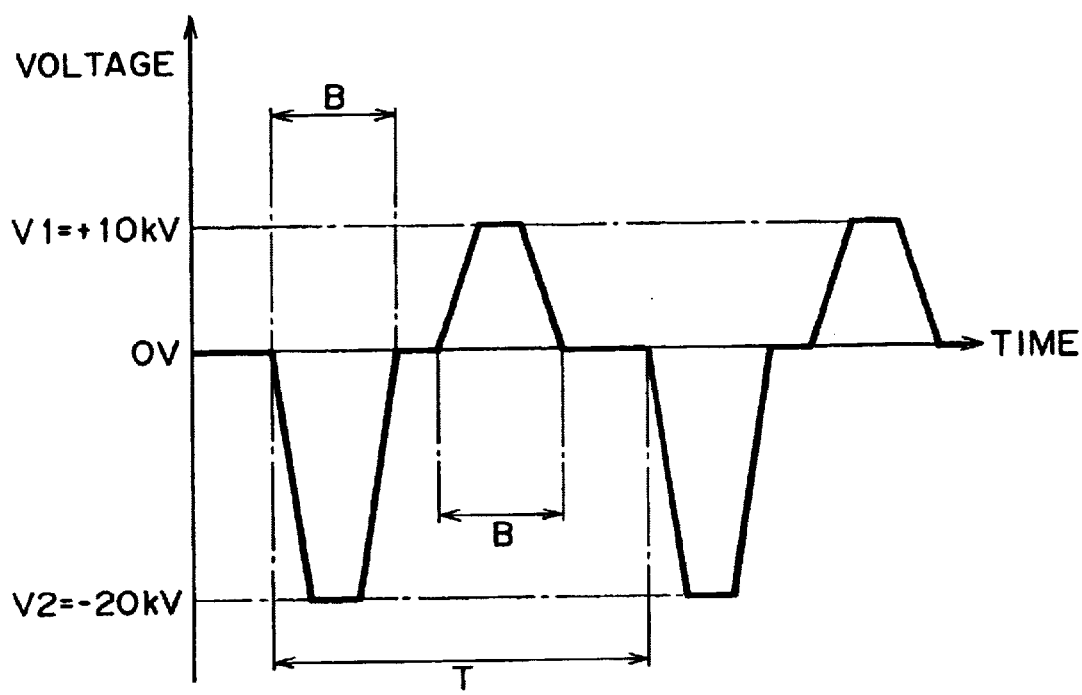
FIGS. 8A and 8B are diagrams showing a waveform of a pulse voltage and a change in pulse current in the ion implantation treatment step, respectively.
Figure 8B:
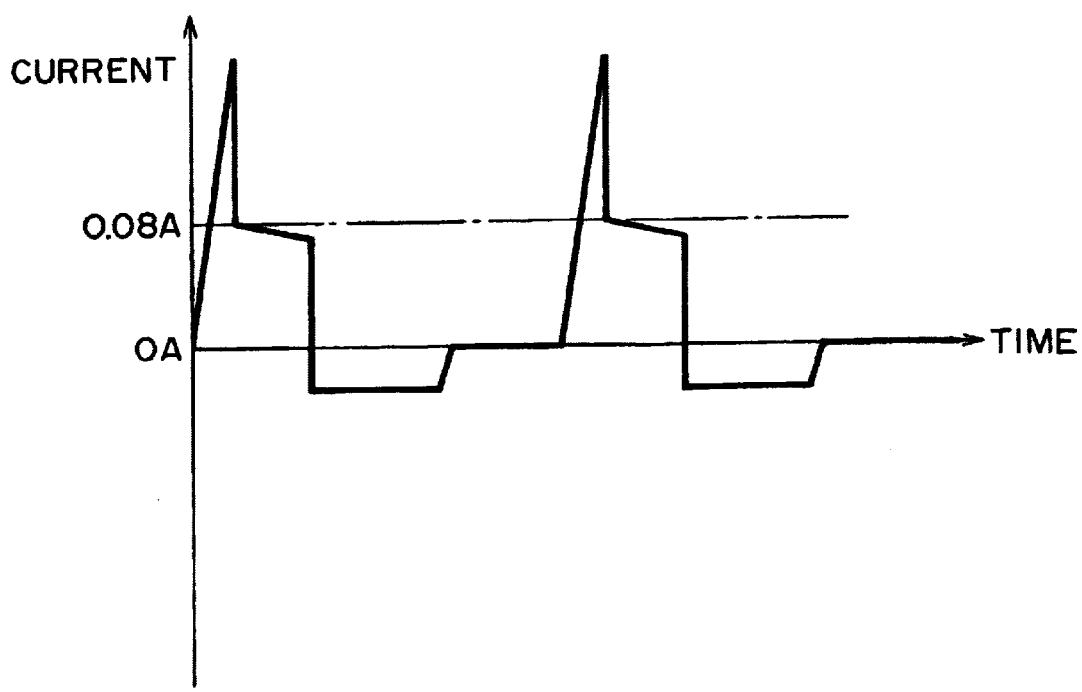

An etching method according to this embodiment will be described with reference to FIGS. 1 to 7 and FIGS. 8A and 8B. The etching method mainly includes an ion implantation treatment, a dry etching treatment, and a wet etching treatment in this order. FIGS. 2 and 3 show the ion implantation treatment; FIGS. 4 and 5 show the dry etching treatment; and FIGS. 6 and 7 show the wet etching treatment. FIGS. 8A and 8B are graphs showing a waveform of a pulse voltage applied to the substrate P at the time of ion implantation treatment and a change in pulse current, respectively. It is to be noted that in each of FIGS. 2 to 7, only an essential portion (a peripheral portion of the substrate P) of the treatment apparatus 10 in each treatment is shown and a cross-sectional configuration of the substrate P is shown for easy understanding of a processing procedure.

Before etching works, the following preparation works are performed by an operator. First, the substrate P made from APO (amorphous polyolefin) and having a thickness of about 0.4 mm is cleaned, and is mounted to the substrate holder 8A (see FIG. 1). After the closed state of the vacuum chamber 1 is confirmed, a series of treatment conditions (for operating the treatment sources 2, 3 and 4, the vacuum pump 5, the introducing terminals 6, the bias power supply 7, and the like) are inputted via an input unit such as a key board. Finally, the coolant W is circulated in the piping 6H to cool the substrate P held by the substrate holder 8A, and the vacuum pump 5 is operated to evacuate the interior of the vacuum chamber 1 to a specific vacuum state.

<<Ion Implantation Treatment>>

After the preparation works are ended, first, as shown in FIG. 2, the substrate P is subjected to ion implantation treatment by the treatment source 2 (Kaufman type ion source), for example, using nitrogen gas as a working gas. For ion implantation treatment, a pulse voltage, which includes a positive pulse voltage and a negative pulse voltage under a condition (see FIG. 8A) with a positive pulse peak value V1=about +10 kV, a negative pulse value V2=about −20 kV, a pulse width B (between positive and negative pulses)=about 60 μsec, and a cycle T=about 1 m sec, is applied from the bias power supply 7 to the substrate P. Ion implantation is performed for about 180 sec under such a current condition that when an ion current of nitrogen ions from the treatment source 2 is about 10 mA, a peak value of a current as a total of an ion current from the bias power supply and a current due to secondary electrons becomes about 0.08 A (see FIG. 8B). A plasma having an energy of about 350 eV, which contains nitrogen ions (implantation ions) N1, is generated in the vacuum chamber 1 by the treatment source 2, and the nitrogen ions N1 are accelerated by the negative pulse voltage (−20 kV) applied to the substrate P. The nitrogen ions N1 with the energy of −20 keV are attracted to the substrate P, to reform the whole of an exposed surface of the substrate P, with a result that a surface reformed layer 21 having a thickness of about 80 nm is formed on the substrate P as shown in FIG. 3. Then, the substrate P is turned over by using the moving arm, and an exposed surface of the substrate P is again subjected to ion implantation treatment. As a result, the overall surface of the substrate P is covered with the surface reformed layer 21 (see FIG. 4).

<<Dry Etching Treatment>>

As shown in FIG. 4, a mask 22 provided with an opening 22U having, for example, a circular opening shape (inner diameter: about 0.035 mm) is placed on the surface, on the side (upper side in the figure) near the treatment source 2, of the surface reformed layer 21. The mask 22 is typically made from a metal or a ceramic, which is previously prepared in the vacuum chamber 1.

As shown in FIG. 5, the whole substrate P is subjected to dry etching treatment by the treatment source 2 using oxygen gas as an etching gas. In this dry etching treatment, an introduced amount of the etching gas is set to about $2.5 \times 10^{-7}$ m³/s (about 15 sccm), an acceleration voltage is set to about 200 V, a background vacuum degree (vacuum degree in the vacuum chamber 1 before discharge of ions) is set to about $2.3 \times 10^{-4}$ Pa, and a working vacuum degree (vacuum degree in the vacuum chamber 1 after discharge of ions) is set to about $5.0 \times 10^{-2}$ Pa. A plasma containing oxygen ions (etching ions) N2 is generated in the vacuum chamber 1 by the treatment source 2, and the oxygen ions N2 having an energy of about 200 eV are selectively bombarded with the surface reformed layer 21. The dry etching treatment is performed until the surface (non-reformed surface) of the substrate P is exposed. As a result, a portion, corresponding to the opening 22U of the mask 22, of the surface reformed layer 21 is selectively removed, to form an opening 21U in the surface reformed layer 21. To increase the etching rate for shortening a time required for forming the opening 21U, a negative pulse voltage may be applied from the bias power supply 7 to the substrate P under a condition with a pulse peak value=about −6 kV, a pulse width=about 60 μsec, and a pulse frequency=about 1 kHz. After that, the substrate P is removed out of the vacuum chamber 1 and the mask 22 is removed.

<<Wet Etching Treatment>>

As shown in FIG. 6, the substrate P is subjected to wet etching treatment by filling a treatment vessel 30 with an etchant E, for example, limonene (d·$C_{10}H_{16}$) which can dissolve the substrate P but cannot dissolve the surface reformed layer 21, and dipping the substrate P in the etchant E with the side, having the opening 21U, of the substrate P directed downwardly. In this wet etching treatment, to smoothly perform the etching treatment, the treatment temperature is set to about 120° C. or less, and ultrasonic waves are generated in the etchant E by an ultrasonic generator. To be more specific, ultrasonic waves are generated under a condition with about 28, 45, 100 kHz and about 100 W by using an ultrasonic generation type cleaning machine sold by HONDA under the trade name of W-113. With this wet etching treatment, only a portion (layer to be etched), corresponding to the opening 21U, of the surface reformed layer 21 is selectively dissolved for about 3 minutes. At this time, since a peripheral portion 21X, around the opening 21U, of the surface reformed layer 21 functions as a mask, etching of the substrate P anisotropically proceeds in the downward direction, and since a portion 21Y, on the side opposed to the opening 21U, of the surface reformed layer 21 functions as an end point of the etching treatment, the etching treatment is ended when etching of the substrate P reaches the surface of the portion 21Y of the surface reformed layer 21. As a result, a fine recess PU1 having a uniform inner diameter (about 0.035 mm) in the depth direction is formed in the substrate P.

It is to be noted that the etchant E is not limited to the above-described limonene. For example, as the etchant E, there may be used an organic solvent such as cyclohexane, cyclohexanone, methyl ethyl ketone, methyl isobutyl ketone, ethyl ether, tetrahydrofuran, xylene, n-pentane, n-hexane, n-octane, 1,2-dicloroethane, methyl acrylate, methyl methacrylate, dioctyl phthalate, or dimethylformamide; a strongly acidic solvent such as concentrated sulfuric acid; or a mixed solvent such as salad oil or margarine. However, in consideration of a dissolution rate to various kinds of plastic materials and environmental contamination of waste, limonene is preferably used as the etchant.

After the substrate P is removed out of the etchant E, foreign matters generated by dissolving the substrate P at the time of wet etching treatment is removed by using an organic solvent such as acetone. Finally, the substrate P is dried to volatilize residues of the solvent components such as limonene and acetone, to obtain the substrate P having the fine recess PU1.

As described above, according to this embodiment, the surface reformed layer 21 insoluble in the etchant E is formed on the surface of the substrate P soluble in the etchant E by ion implantation treatment; the opening 21U is formed in the surface reformed layer 21 by dry etching treatment; and the substrate P is subjected to wet etching treatment using the etchant E. In this case, at the time of wet etching treatment, the peripheral portion 21X, around the opening 21U, of the surface reformed layer 21 functions as a mask to allow etching to proceed anisotropically, and the portion 21Y, on the side opposed to the opening 21U, of the surface reformed layer 21 functions as an end point of etching. As a result, unlike the related art plastic working method using molding and cutting techniques, the etching method according to this embodiment makes it possible to form the recess PU1 having a uniform inner diameter in the depth direction, and hence to accurately form a fine structure in the plastic substrate P.

According to this embodiment, various micro-machines useful in various industrial fields can be accurately formed by making use of the substrate P having the recess PU1.

According to this embodiment, at the time of ion implantation treatment, a pulse voltage including a positive pulse voltage and a negative pulse voltage is applied from the bias power supply 7 to the substrate P, and accordingly, even in the case of using the substrate P made from an insulating plastic material, electric charges are not stored in the substrate P at the time of ion implantation treatment. As a result, it is possible to smoothly, uniformly implant ions in the substrate P by eliminating occurrence of a delay of ion implantation due to charge-up.

According to this embodiment, the surface reformed layer 21 is formed by subjecting the substrate P to ion implantation treatment, and accordingly, the surface reformed layer 21 can be simply formed, as compared with formation of the surface reformed layer 21 (more strictly, the layer having the same function as that of the surface reformed layer 21) on the substrate P by film formation treatment.

The reason why a plastic material can be used as the material of the substrate P in this embodiment is as follows: namely, according to this embodiment, the Kaufman type ion source (treatment source 2) or the FCVA ion source (treatment source 4) operable at a relatively low environmental temperature (about 100° C. or less) at the time of ion implantation or dry etching is used and wet etching treatment is performed at a relatively low environmental temperature (about 120° C.), so that the substrate P is not exposed to a high temperature environment (a softening temperature of a general plastic material or more) unlike a semiconductor process treated at a relatively high environmental temperature (about 400° C. or more).

Although in this embodiment, limonene which cannot dissolve the surface reformed layer 21 but can dissolve the substrate P is used as the etchant E, the present invention is not limited thereto. For example, a solution having such a selective dissolution characteristic that a selection ratio of etching of the substrate P to etching of the surface reformed layer 21 is high (the dissolution rate for the substrate P is sufficiently larger than the dissolution rate for the surface reformed layer 21) may be used as the etchant E. Even in this case, the same effect as that obtained in the above embodiment can be obtained by making use of a difference between the dissolution characteristics for the substrate P and the surface reformed layer 21.

In the embodiment, only one recess PU1 is formed in the substrate P; however, a plurality of recesses PU1 can be formed in the substrate P. In this case, the substrate P has a membrane structure including a plurality of recesses PU1. The plurality of recesses PU1 can be formed in the substrate P as follows: namely, a plurality of openings 21U are formed in the surface reformed layer 21 by dry etching treatment (see FIGS. 4 and 5) using a mask 22 having a plurality of openings 22U, and then the substrate P is subjected to wet etching treatment (see FIGS. 6 and 7) in the same manner as that described in the above embodiment.

Although in the embodiment, the treatment source 2 configured as the Kaufman type ion source is used for carrying out ion implantation treatment, the present invention is not limited thereto. For example, the treatment source 4 configured as the FCVA ion source can be used for carrying out ion implantation treatment. In this case, the treatment source 4 may be operated to generate ions having an energy of about 25 eV under a condition with a working vacuum degree=about $5 \times 10^{-4}$ Pa, a positive pulse peak value V1=about +10 kV, a negative pulse peak value V2=about −20 kV, a pulse width B (between positive and negative pulses)=about 60 μsec, a cycle T=about 1 kHz, and a pulse ion current=about 0.7 A.

Although in the embodiment, a ceramic material is used as the material of the mask 22, the present invention is not limited thereto. For example, an insulating resin material such as PMMA may be used as the material of the mask 22. In this case, after the surface reformed layer 21 is formed on the surface of the substrate P (see FIG. 4), the substrate P is removed out of the vacuum chamber 1 and then the surface reformed layer 21 is coated with PMMA by a film formation manner such as a spin-coat manner to form a PMMA resist on the surface reformed layer 21. Subsequently, the PMMA resist is selectively exposed and developed by using a general purpose mask aligner and a UV exposure system, to form a mask 22 having an opening 22U, like the mask 22 shown in FIG. 4. In addition, the steps subsequent to the mask formation step are the same as those described in FIGS. 5 to 7 in the above embodiment.

[Second Embodiment]

Figures 9, 10:
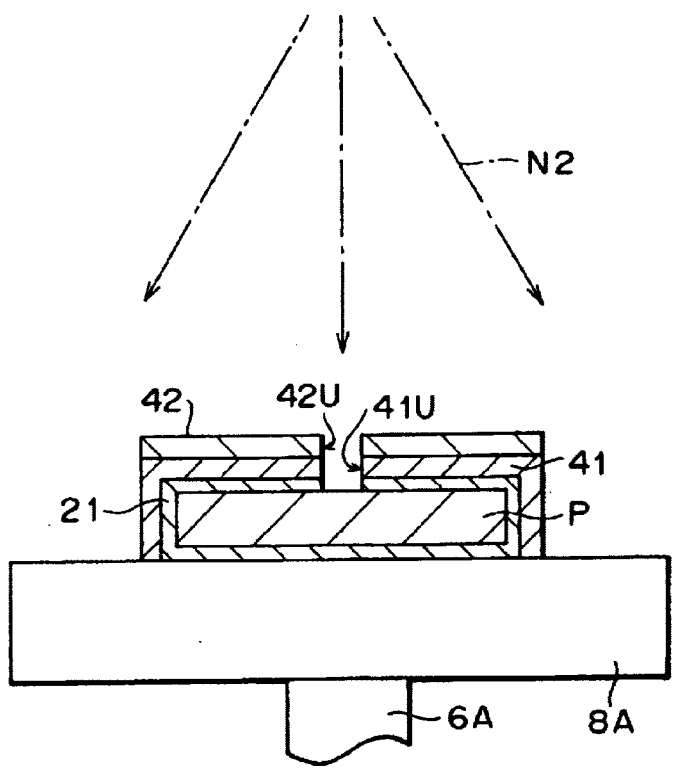
FIG. 9 is a view illustrating a film formation treatment in an etching method according to a second embodiment of the present invention.
FIG. 10 is a view illustrating a dry etching treatment.
Figure 11:
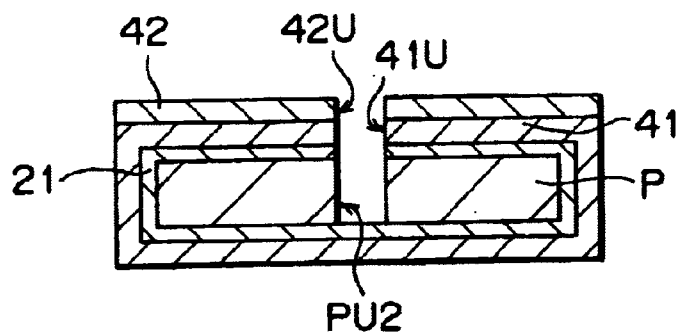
FIG. 11 is a sectional view showing a cross-sectional structure of a substrate and the like formed by an etching method according to a second embodiment of the present invention.

An etching method according to a second embodiment of the present invention will be described with reference to FIGS. 9 to 11. The etching method according to this embodiment mainly includes an ion implantation treatment, a film formation treatment, a dry etching treatment, and a wet etching treatment in this order. FIG. 9 shows the film formation treatment, FIG. 10 shows the dry etching treatment, and FIG. 11 shows a cross-sectional configuration of a substrate P formed by the etching method in this embodiment. It is to be noted that in FIGS. 9 to 11, parts corresponding to those in the first embodiment are designated by the same reference numerals as those in the first embodiment.

Figure 3:
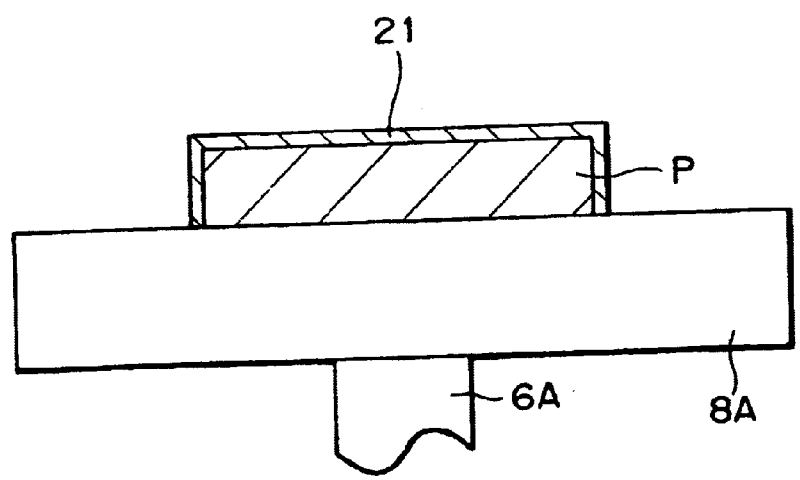
FIG. 3 is a view illustrating a step subsequent to the step shown in FIG. 2.
Figure 4:
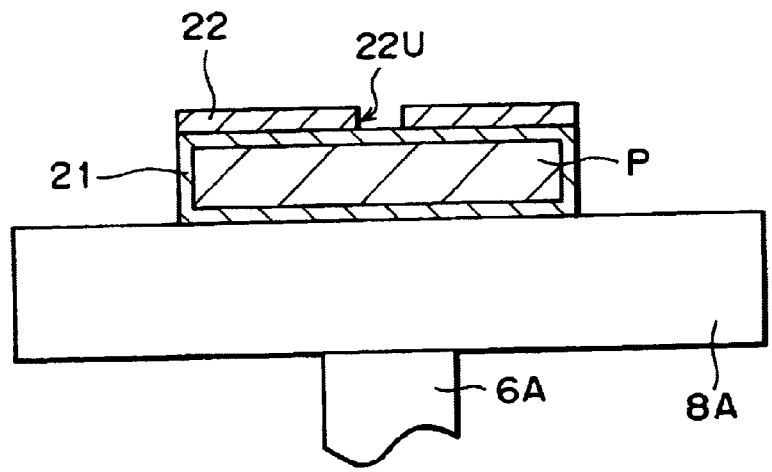
FIG. 4 is a view illustrating a dry etching treatment step.

In this embodiment, steps until a surface reformed layer 21 is formed as shown in FIG. 9 are the same as those described in FIGS. 2 to 4 in the first embodiment, and therefore the overlapped description thereof is omitted.

<<Film Formation Treatment>>

According to this embodiment, after a surface reformed layer 21 is formed, as shown in FIG. 9, a substrate P is moved to the substrate holder 8C by using the moving arm, and then a carbon thin film 41, for example, a ta-C (tetrahedral amorphous carbon) thin film, is formed to a thickness of about 100 nm so as to cover the surface reformed layer 21. In the case of forming the carbon thin film 41, a working voltage of the treatment source 4 is set to about 25 V. At the time of film formation, carbon ions N3 having an ion current of about 0.7 A and an energy of about 25 eV are generated in the vacuum chamber 1, and are induced to the substrate P by two duct coil optical systems mounted on the treatment source 4.

<<Dry Etching Treatment>>

As shown in FIG. 10, the substrate P is moved to the substrate holder 8A by using the moving arm, and thereafter, like the dry etching treatment (see FIG. 5) described in the first embodiment, a mask 42 having an opening 42U is placed on the carbon thin film 41. Subsequently, the whole substrate P is subjected to dry etching treatment by using the treatment source 2 (for example, oxygen ions N2), whereby both the surface reformed layer 21 and the carbon thin film 41 are selectively removed until the substrate P is exposed, to form the opening 41U.

<<Wet Etching Treatment>>

After the mask 42 is removed, like the wet etching treatment in the first embodiment (see FIG. 6), the substrate P is dipped in the etchant E such as limonene, to selectively etch the substrate P, with a result that as shown in FIG. 11, a fine recess PU2 is formed in the substrate P. Like the recess PU1 in the first embodiment, the recess PU2 can be accurately formed so as to have a uniform inner diameter in the depth direction. Finally, the substrate P is removed out of the etchant E and is dried.

According to this embodiment, since the carbon thin film 41 is formed on the surface reformed layer 21 and thereafter the substrate P is subjected to dry etching treatment and wet etching treatment in this order like the first embodiment, the fine recess (opening 41U and recess PU2) extending in a region from the substrate P to the carbon thin film 41 can be formed. As a result, various micro-machines can be accurately formed by making use of the substrate P having the recess PU2. Of course, even if a thin film made from a metal or a ceramic is formed in place of the carbon thin film 41 by film formation treatment, the same effect as that for the carbon thin film 41 with respect to a formation accuracy of a micro-machine can be obtained.

According to this embodiment, since the carbon thin film 41 is formed on the surface reformed layer 21 excellent in adhesion with various thin films, the carbon thin film 41 can be forcibly bonded to the substrate P via the surface reformed layer 21, unlike the case of directly forming the carbon thin film 41 on the substrate P made from a plastic material which is poor in adhesion with various thin films. This makes it possible to eliminate an inconvenience such as cracking or peeling of the carbon thin film 41 after bonding of the carbon thin film 41. Of course, even if a thin film made from a metal or a ceramic is formed in place of the carbon thin film 41, the same effect as that for the carbon thin film 41 with respect to adhesion of the thin film with the substrate P can be obtained.

It is to be noted that treatment conditions (for dry etching treatment and wet etching treatment) other than those described in this embodiment, and functions, effects, and modifications of this embodiment are the same as those described in the first embodiment.

[Third Embodiment]

Figure 12:
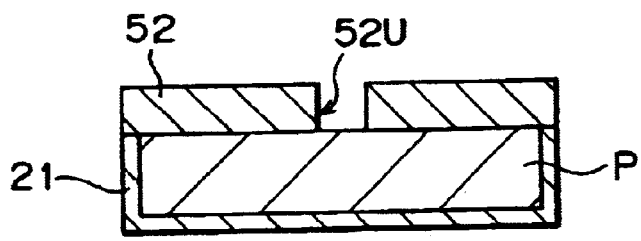
FIG. 12 is a view illustrating a wet etching treatment in an etching method according to a third embodiment of the present invention.
Figure 13:
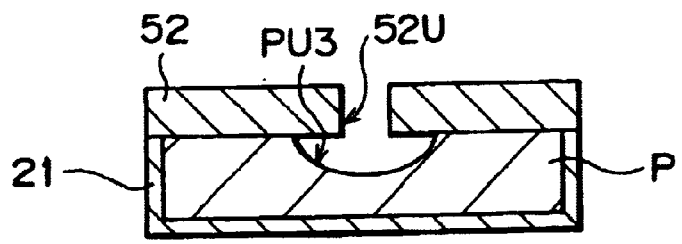
FIG. 13 is a sectional view showing a cross-sectional structure of a substrate and the like formed by an etching method according to a third embodiment of the present invention.

An etching method according to a third embodiment of the present invention will be described with reference to FIGS. 12 and 13. The etching method according to this embodiment mainly includes an ion implantation treatment and a wet etching treatment in this order. FIG. 12 shows the wet etching treatment, and FIG. 13 shows a cross-sectional configuration of a substrate P formed by the etching method according to this embodiment. It is to be noted that in FIGS. 12 to 13, parts corresponding to those in the first embodiment are designated by the same reference numerals as those in the first embodiment.

<<Ion Implantation Treatment>>

According to the ion implantation treatment in this embodiment, unlike the first embodiment in which the ion implantation treatment is repeated twice to form the surface reformed layer 21 on each of the both surfaces of the substrate P, the ion implantation is performed once to form a surface reformed layer 21 only on one surface of a substrate P. Accordingly, the surface reformed layer 21 is not formed on the other surface of the substrate P, and thereby the other surface of the substrate P is exposed (see FIG. 3). It is to be noted that steps until the ion implantation treatment step are the same as those shown in FIGS. 2 and 3 in the first embodiment, and therefore the overlapped description thereof is omitted.

<<Wet Etching Treatment>>

After the surface reformed layer 21 is formed, as shown in FIG. 12, the substrate P is removed out of the vacuum chamber 1, and a mask 52 having an opening 52U is placed on the exposed surface of the substrate P. A structure, a material, and a formation method of the mask 52 may be the same as those of the mask 22 in the first embodiment (see FIG. 4).

The substrate P on which the mask 52 has been placed is dipped in the etchant E such as limonene like the wet etching treatment in the first embodiment (see FIG. 6), to selectively remove the substrate P. At this time, since the surface reformed layer 21 (21X) for allowing etching to proceed anisotropically is not formed between the substrate P and the mask 52 unlike the first embodiment in which the surface reformed layer 21 (21X) is formed between the substrate P and the mask 22 (see FIG. 7), etching of the substrate P proceeds isotropically, with a result that as shown in FIG. 13, a recess PU3 having a circular-arc shaped etching plane, which has a diameter larger than that of the opening 52U is formed. Finally, the substrate P is removed out of the etchant E, and is dried.

According to this embodiment, of the two functions of the surface reformed layer 21 described in the first embodiment, the function as the mask (21X, see FIG. 7) is not used, and only the function of determining an end point of etching is used. As a result, unlike the first embodiment in which wet etching proceeds anisotropically, wet etching proceeds isotropically, to simply, accurately form the recess PU3 having a circular-arc shaped etching plane. Of course, various micro-machines can be used by making use of the substrate P having the recess PU3. It is to be noted that an inner diameter, a depth, and the like of the recess PU3 can be freely set by adjusting a treatment time at the time of wet etching treatment.

According to this embodiment, in the case of providing a plurality of recesses PU3 arrayed, for example, in a matrix by using a transparent plastic material as the material of the substrate P, a microlens array useful in the optical field can be formed.

It is to be noted that treatment conditions (for wet etching treatment), and functions, effects, and modifications of this embodiment are the same as those described in the previous embodiments.

[Fourth Embodiment]

Figure 14:
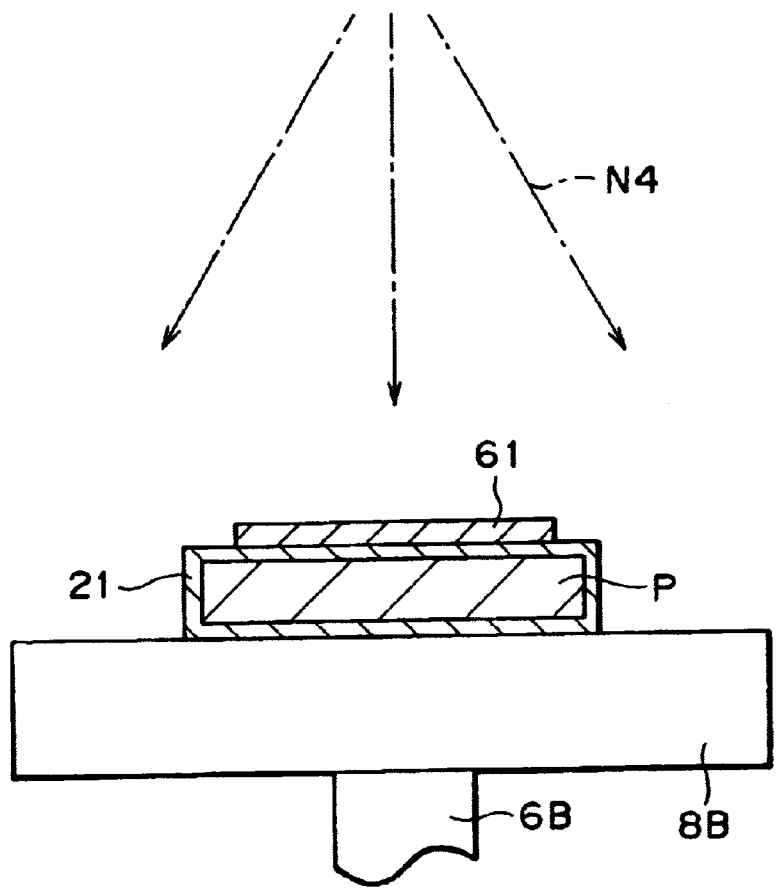
FIG. 14 is a view illustrating a film formation treatment in an etching method according to a fourth embodiment of the present invention.
Figure 15:
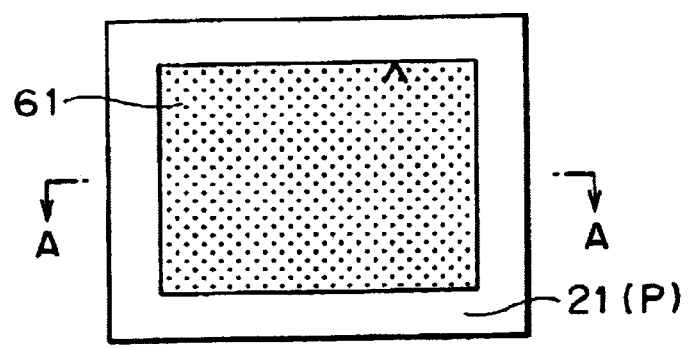
FIG. 15 is a plan view showing a plane structure of a substrate and the like shown in FIG. 14.
Figure 16:
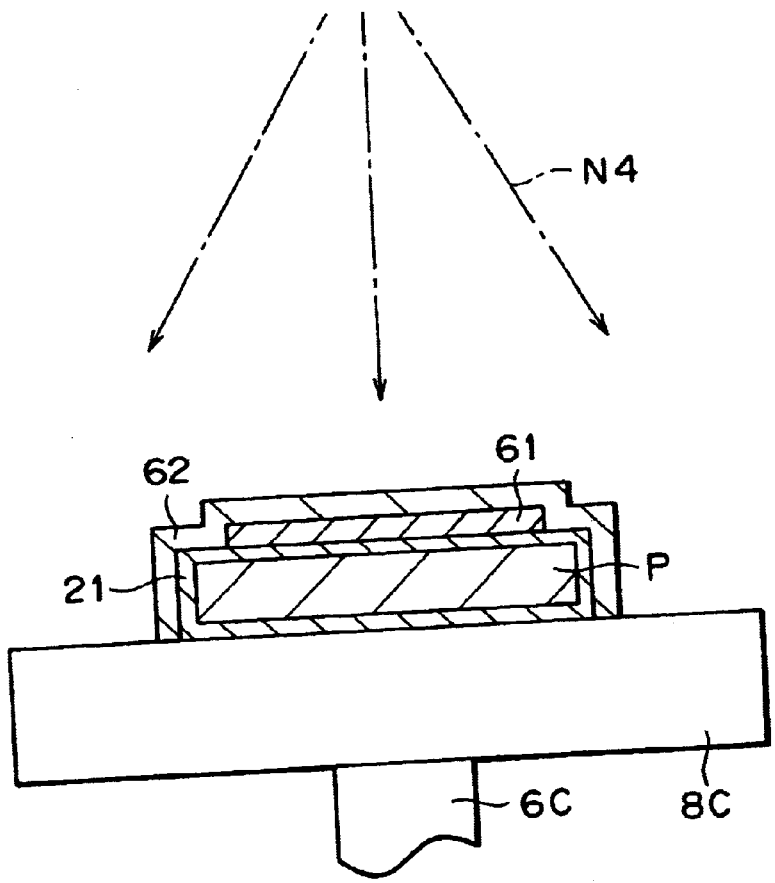
FIG. 16 is a view illustrating a step subsequent to the step shown in FIG. 14.
Figure 17:
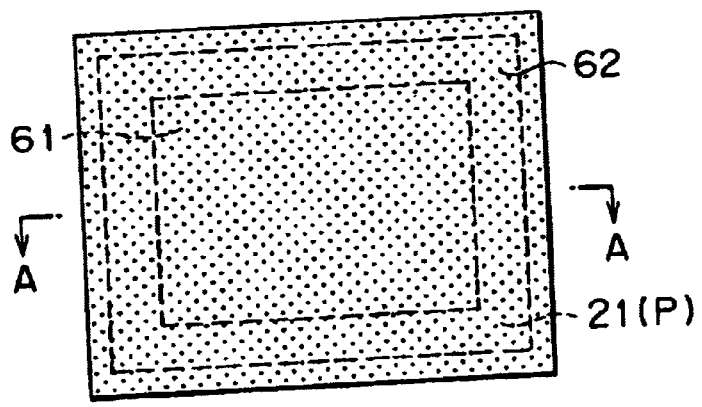
FIG. 17 is a plan view showing a plane structure of the substrate and the like shown in FIG. 16.
Figure 18:
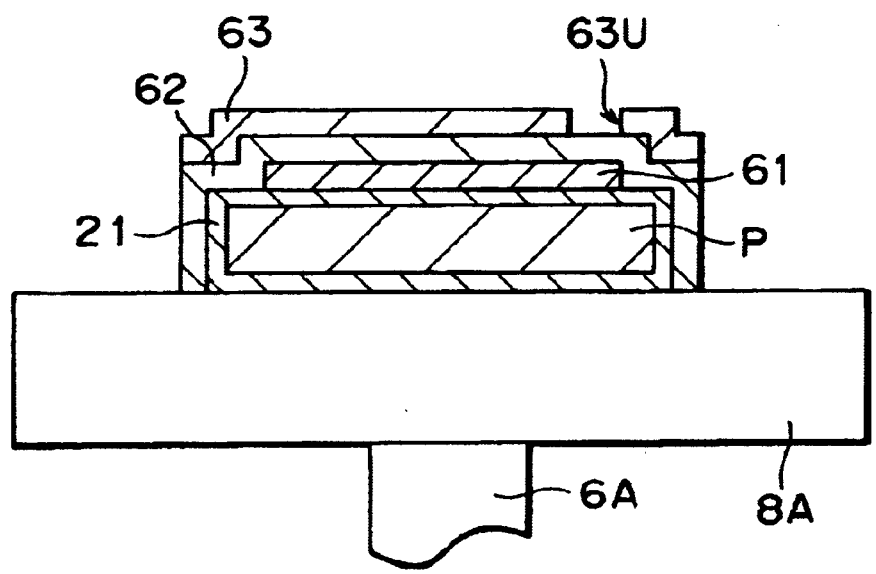
FIG. 18 is a view illustrating a dry etching treatment in the etching method according to the fourth embodiment.
Figure 19:
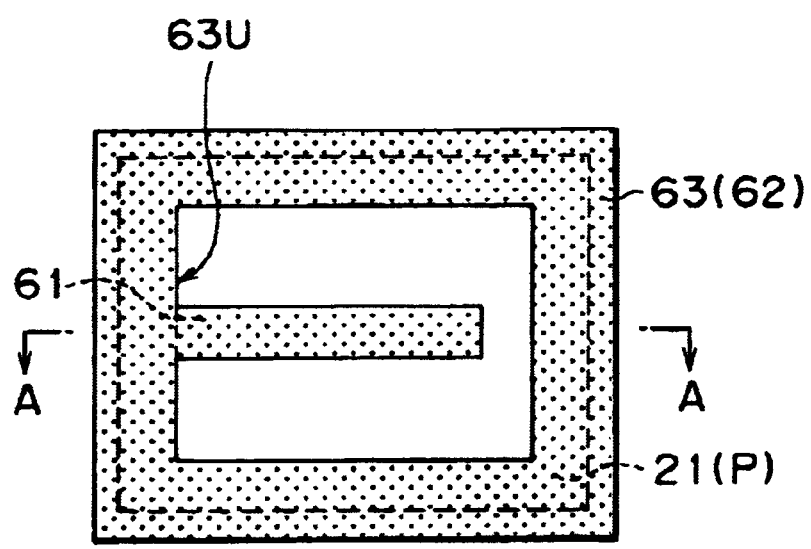
FIG. 19 is a plan view showing a plane structure of the substrate and the like shown in FIG. 18.
Figure 20:
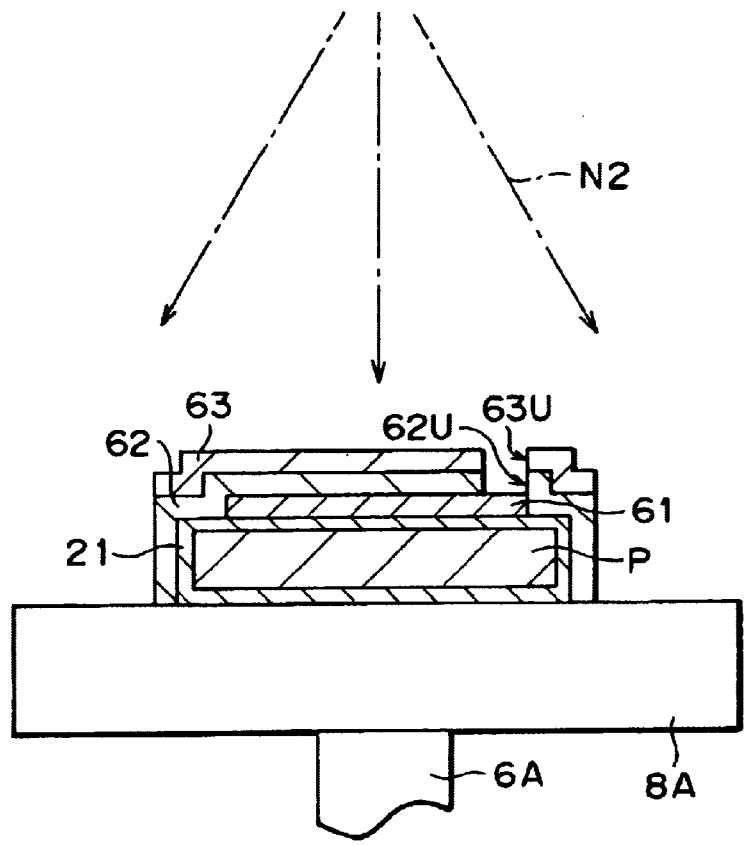
FIG. 20 is a view illustrating a step subsequent to the step shown in FIG. 18.
Figure 21:
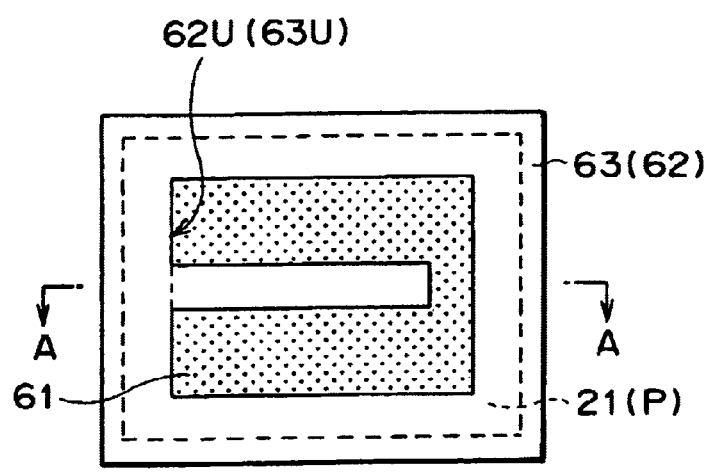
FIG. 21 is a plan view showing a plane structure of the substrate and the like shown in FIG. 20.
Figure 22:
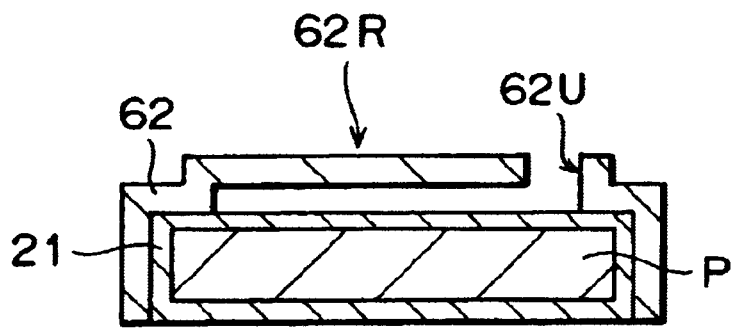
FIG. 22 is a sectional view showing a cross-sectional structure of the substrate and the like formed by the etching method according to the fourth embodiment of the present invention.
Figure 23:
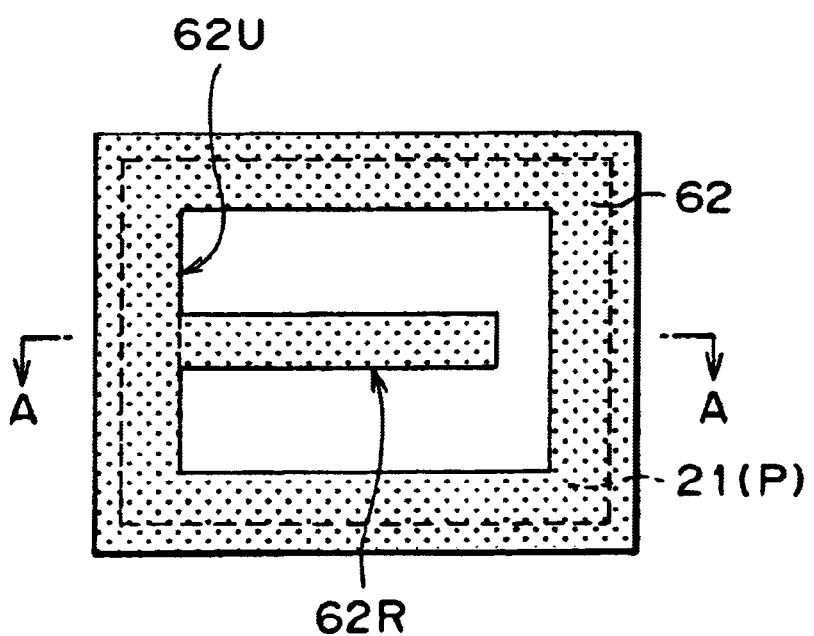
FIG. 23 is a plan view showing a plane structure of the substrate and the like shown in FIG. 22.

An etching method according to a fourth embodiment of the present invention will be described with reference to FIGS. 14 to 23. The etching method according to this embodiment mainly includes an ion implantation treatment, a film formation treatment, a dry etching treatment, and a wet etching treatment in this order. FIGS. 15 and 17 are plan views of a substrate P after film formation treatment, and FIGS. 14 and 16 are sectional views taken on line A—A of FIGS. 15 and 17, respectively; FIGS. 19 and 21 are plan views of the substrate P after dry etching treatment, and FIGS. 18 and 20 are sectional views taken on line A—A of FIGS. 19 and 21, respectively; and FIG. 23 is a plan view of the final substrate P obtained by the etching method according to this embodiment, and FIG. 22 is a sectional view taken on line A—A of FIG. 23. In these figures, parts corresponding to those in the first embodiment are designated by the same reference numerals as those in the first embodiment.

According to this embodiment, first, a surface reformed layer 21 is formed overall on the surface of a substrate P, for example, having a rectangular plane shape in accordance with the same ion implantation treatment as that in the first embodiment (see FIGS. 2 to 4).

<<Film Formation Treatment>>

As shown in FIGS. 14 and 15, the substrate P is moved to the substrate holder 8B by using the moving arm, and a sacrificial layer 61 made from copper or the like is selectively formed to a thickness of about 40 nm on a nearly central portion of the surface reformed layer 21 by the treatment source 3 (DC sputter source). The sacrificial layer 61 is formed into, for example, a rectangular shape in a plan view. The sacrificial layer 61 is a layer for temporarily supporting a carbon thin film 62 (see FIGS. 16 and 17) to be formed on the sacrificial layer 61 in the subsequent step, and which is to be dissolved and removed by the etchant E at the time of wet etching treatment.

As shown in FIGS. 16 and 17, like the second embodiment (see FIG. 9), the substrate P is moved to the substrate holder 8C by using the moving arm, and a carbon thin film 62, for example a ta-C thin film is formed to a thickness of about 100 nm so as to cover the substrate P by the treatment source 4 (FCVA ion source.). A portion, formed on the sacrificial layer 61, of the carbon thin film 62 is higher than the remaining portion of the carbon thin film 62.

<<Dry Etching>>

As shown in FIGS. 18 and 19, the substrate P is moved to the substrate holder 8A by using the moving arm, and a mask 63 having an opening 63U having, for example a U-shape is placed on the carbon thin film 62. The size of the opening 63U is set to correspond to the size of the sacrificial layer 61 (see FIG. 19).

As shown in FIGS. 20 and 21, the substrate P is subjected to dry etching treatment via the opening 63U of the mask 63 by the treatment source 2 (for example, oxygen ions N2), to selectively remove the carbon thin film 62 until the sacrificial layer 61 is exposed, thereby forming an opening 62U.

<<Wet Etching Treatment>>

After the mask 63 is removed, the substrate P is dipped in the etchant E like the wet etching treatment in the first embodiment (see FIG. 6). According to this embodiment, however, a ferric chloride solution which cannot dissolve the surface reformed layer 21 and the carbon thin film 62 but can dissolve the sacrificial layer 61 is used as the etchant E. With this wet etching treatment, only the sacrificial layer 61 (layer to be etched) is selectively dissolved. Consequently, as shown in FIGS. 22 and 23, a fine beam structure having a beam portion 62R is formed. One end portion of the beam portion 62R is supported by the substrate P and the other end portion thereof is separated from the other portion of the carbon thin film 62 and the substrate P. In this wet etching treatment, since the surface reformed layer 21 functions as a protective material for preventing the substrate P from being dissolved, the substrate P is not dissolved by wet etching. Finally, the substrate P is removed out of the etchant E, and is dried.

According to this embodiment, since the surface reformed layer 21 is used as a protective material for preventing the substrate P from being dissolved by wet etching and the sacrificial layer 61 is removable by wet etching, a fine beam structure can be accurately formed while preventing the substrate P from being dissolved. Of course, various micro-machines can be formed by making used of the substrate P having the beam structure.

Figure 24:
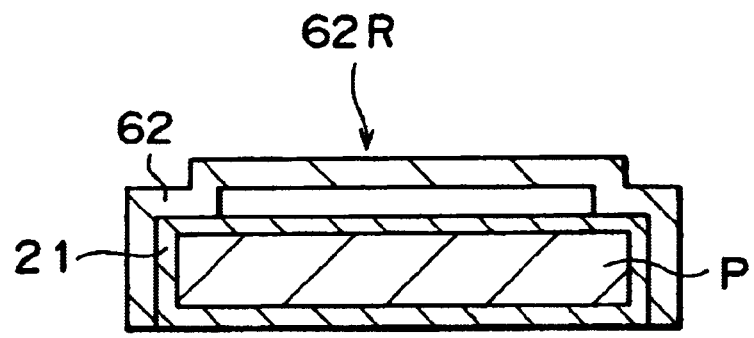
FIG. 24 is a sectional view of a substrate and the like, showing a beam structure as a modification of the beam structure formed by the etching method according to the fourth embodiment of the present invention.
Figure 25:
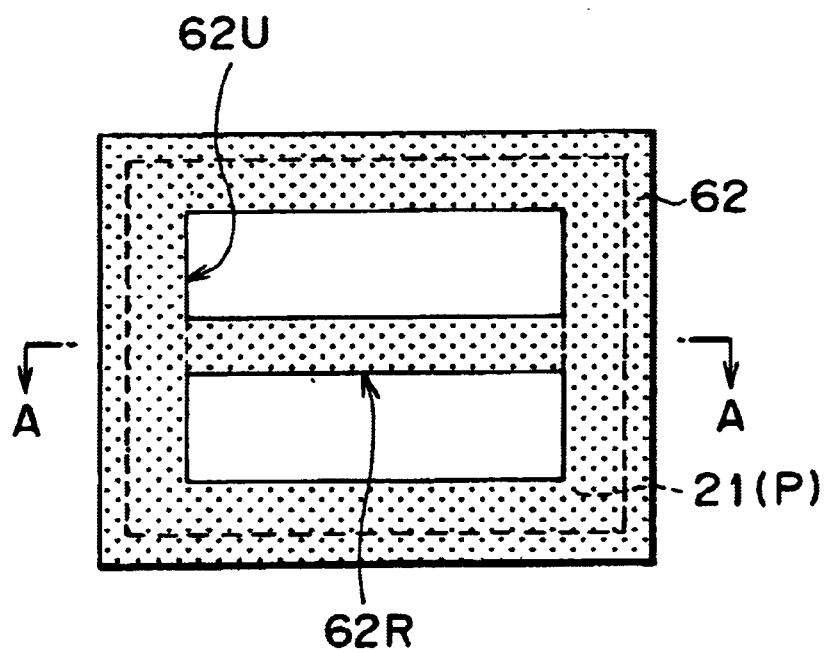
FIG. 25 is a plan view showing a plane structure of the substrate and the like shown in FIG. 24.

According to this embodiment, beam structures other than that shown in FIGS. 22 and 23 can be formed. FIGS. 24 and 25, similar to FIGS. 22 and 23, show a modification of the beam structure formed according to this embodiment. In the modification shown in FIGS. 24 and 25, a beam portion 62R has a structure that the other end portion thereof is connected to the other portion of the carbon thin film 62. Such a beam structure can be formed by changing the shape of the opening 63U of the mask 63 used for dry etching treatment. Of course, according to this embodiment, in addition to the beam structure, any other three-dimensional structure can be formed.

Although in this embodiment, copper is used as the material of the sacrificial layer 61 and the fame chloride solution is used as the etchant E, the present invention is not limited thereto. That is to say, the materials of the sacrificial layer 61 and the etchant E can be freely changed insofar as a solution which cannot dissolve the components (for example, the surface reformed layer 21 and the carbon thin film 62) other than the sacrificial layer 61 but can dissolve the sacrificial layer 61 is used as the etchant E. In addition, according to this embodiment, like the first embodiment, a solution having such a selective dissolution characteristic that a selection ratio of etching of the sacrificial layer 61 to etching of the surface reformed layer 21 and the carbon thin film 62 is high may be used. In this case, the same effect as that obtained by the first embodiment can be obtained by making use of a difference in dissolution characteristic.

It is to be noted that treatment conditions (for wet etching treatment) other than those described in this embodiment, and functions, effects, and modifications of this embodiment are the same as those described in the previous embodiments.

Although the present invention has been described by way of the preferred embodiments, the present invention is not limited thereto but may be variously changed. For example, the configuration of the treatment apparatus 10 used for the series of etching steps and also the treatment processes (ion implantation process, film formation process, and etching process) used for respective treatments are not limited to those described in the embodiments but may be freely changed insofar as the same functions of the components (for example, treatment sources) as those in the embodiments and also the same treatment results as those in the embodiments can be ensured. Even in this case, the same effect as that obtained by each embodiment can be obtained.

Figure 26:
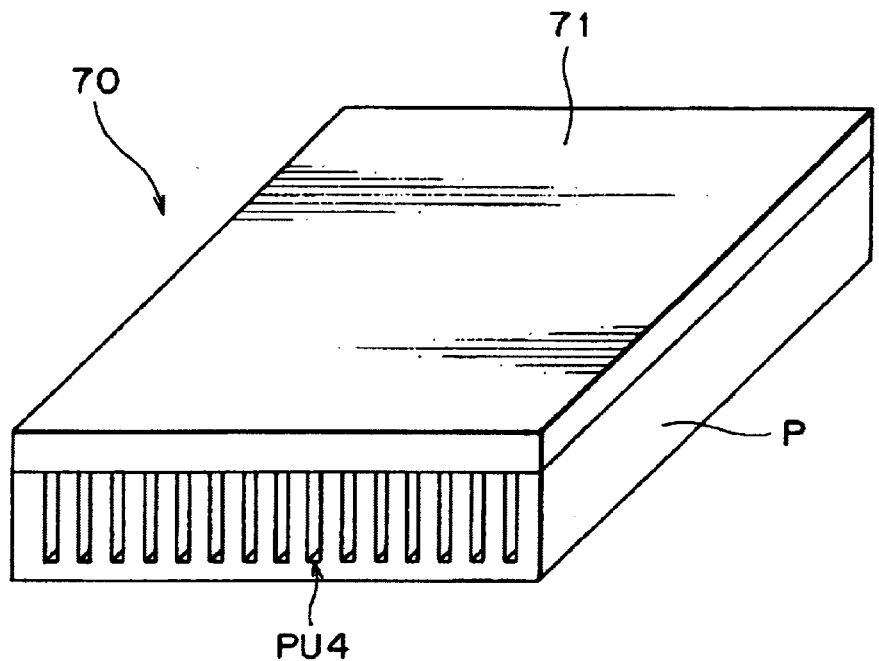
FIG. 26 is a view showing a configuration of a microchannel.
Figure 27:
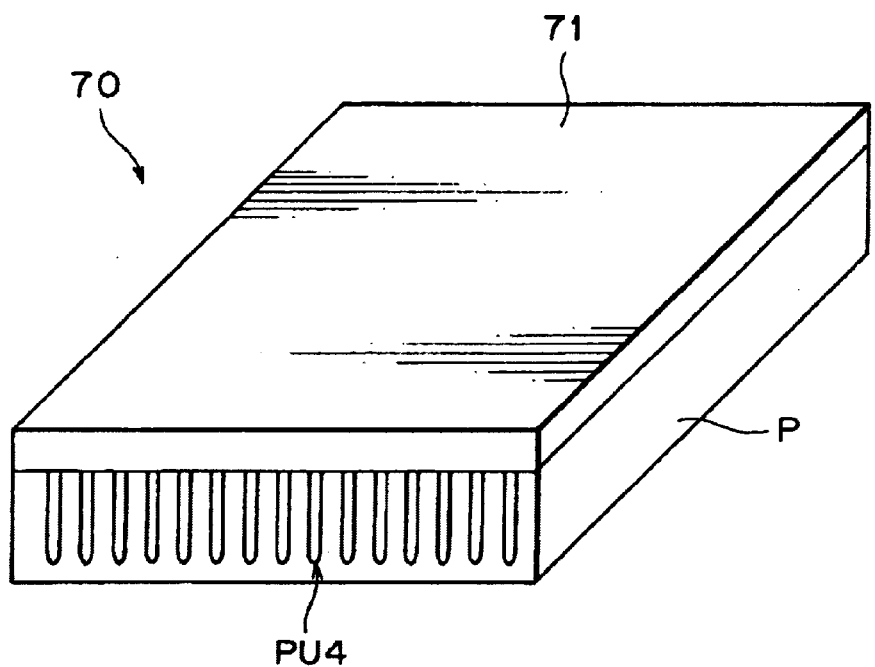
FIG. 27 is a view showing a configuration of another microchannel.

Although the recess structures (PU1, PU2 and PU3) and the beam structures (beam portion 62U) as the fine structures formable by the etching treatment have been described in the embodiments, the present invention is not limited thereto. That is to say, any other fine structure can be formed by controlling the etching direction (anisotropic or isotropic direction) at the time of wet etching treatment. For example, as shown in FIG. 26, a heat radiation device such as a microchannel can be formed by using a substrate P formed by etching treatment. FIG. 26 shows a configuration example of a microchannel 70 formable by etching. The microchannel 70 includes a substrate P having a plurality of grooves PU4 formed in the same manner as that for forming the recess PU1 in the first embodiment and a cover plate 71 disposed so as to cover the grooves PU4 of the substrate P with an adhesive bonding layer (not shown) put therebetween. In addition, a protective layer may be disposed between the cover plate 71 and the adhesive bonding layer. With respect to the substrate P, a width of the groove PU4 (channel width) is set to about 10 μm, and a width between two of the grooves PU4 (pillar width) is set to about 100 μm. The grooves PU4 of the microchannel 70 are filled with liquid such as water, methyl alcohol, or ethyl alcohol. As shown in FIG. 27, a microchannel 70 including grooves PU4, each having a circular-arc shaped etching plane, can be formed by the same manner as that for forming the recess PU3 in the third embodiment. Of course, a plurality of microchannels 70 can be stacked to each other.

Although in the above embodiments, the present invention has been described by way of the example in which the substrate P having the fine structure formed by etching is used for a micro-machine, the present invention is not limited thereto but may be applied to any other industrial field. For example, a substrate P having a groove structure continuous in the in-plane direction, which is formed in the same manner as that for forming the microchannel 70, can be used as a groove to be formed on a disc such as a CD (Compact Disc), HD (Hard Disc), or MD (Mini Disc).

What is claimed is:

1. An etching method comprising:
   a first step of subjecting a plastic substrate to ion implantation treatment, to reform a surface of said plastic substrate, thereby forming a surface reformed layer; and
   a second step of subjecting said plastic substrate to wet etching treatment using a specific etchant by determining an end point of the wet etching treatment with the use of said surface reformed layer, wherein a solution, which has a high selection ratio of etching of a layer to be etched is said second step at least to etching of said surface reformed layer, is used as said etchant.

2. An etching method according to claim 1, wherein a solution, which can dissolve a layer to be etched in said second step and cannot dissolve said surface reformed layer, is used as said etchant.

3. An etching method according to claim 1, wherein limonene is used as said etchant.

4. An etching method according to claim 1, wherein said second step is carried out in an ultrasonic environment.

5. An etching method according to claim 1, further comprising a third step of forming a specific thin film on said surface reformed layer, said third step being inserted between said first step and said second step.

6. An etching method comprising:
   a first step of subjecting both surfaces of a plastic substrate to ion implantation treatment, to reform both the surfaces of said plastic substrate, thereby forming a surface reformed layer on both the surfaces of said plastic substrate;
   a second step of placing a mask having an opening on said surface reformed layer, and subjecting said surface reformed layer to dry etching treatment by using said mask, thereby forming an opening in said surface reformed layer; and
   a third step of subjecting, after removal of said mask, said plastic substrate to wet etching treatment using a specific etchant with said opening formed in said surface reformed layer taken as a start point of etching and a portion, opposed to said opening, of said surface reformed layer taken as an end point of etching, thereby forming a fine structure in said plastic substrate.

7. An etching method according to claim 6, wherein said first step is carried out by generating a plasma containing implantation ions in a vacuum chamber, and attracting said plasma to said plastic substrate placed in said vacuum chamber, thereby implanting the implantation ions in said plastic substrate.

8. An etching method according to claim 6, wherein said fine structure is a recess having a uniform inner diameter in the depth direction.

9. An etching method according to claim 6, wherein a solution, which has a high selection ratio of etching of a portion of said plastic substrate to be etched in said third sep at least to etching of said surface reformed layer, is used as said etchant.

10. An etching method according to claim 6, wherein limonene is used as said etchant.

11. An etching method according to claim 6, wherein said third step is carried out in an ultrasonic environment.

12. An etching method according to claim 6, further comprising a fourth step of forming a specific thin film on said surface reformed layer between said first step and said second step, wherein in said second step, an opening is formed in said surface reformed layer and said thin film.

13. An etching method according to claim 12, wherein said specific thin film is a carbon thin film.

14. An etching method comprising:
   a first step of subjecting only one surface of a plastic substrate to ion implantation treatment, to reform the surface of said plastic substrate, thereby forming a surface reformed layer on the surface of said plastic substrate; and
   a second step of placing a mask having an opening on an exposed surface, on which said surface reformed layer is not formed, of said plastic substrate, and subjecting said plastic substrate to wet etching treatment using specific etchant with said opening of said mask taken as a start point of etching and a portion, opposed to said opening, of said surface reformed layer taken as an end point of etching, thereby forming a fine structure in said plastic substrate.

15. An etching method according to claim 14, wherein said first step is carried out by generating a plasma containing implantation ions in a vacuum chamber, and attracting said plasma to said plastic substrate placed in said vacuum chamber, thereby implanting the implantation ions in said plastic substrate.

16. An etching method according to claim 14, wherein said fine structure is a recess having a circular-arc etching plane.

17. An etching method according to claim 14, wherein in a solution, which has a high selection ratio of etching of a portion of said plastic substrate to be etched in said second step at least to etching of said surface reformed layer, is used as said etchant.

18. An etching method according to claim 14, wherein limonene is used as said etchant.

19. An etching method according to claim 14, wherein said second step is carried out in an ultrasonic environment.

20. An etching method comprising:
- a first step of subjecting both surfaces of a plastic substrate to ion implantation treatment, to reform both the surfaces of said plastic substrate, thereby forming a surface reformed layer on both the surfaces of said plastic substrate;
- a second step of forming a sacrificial layer at a nearly central portion on said surface reformed layer;
- a third step of forming a thin film so as to cover said plastic substrate on which said sacrificial layer has been formed;
- a fourth step of placing a mask having an opening on said thin film, and subjecting said thin film to dry etching treatment using said mask so as to selectively remove said thin film until said sacrificial layer is exposed, thereby forming an opening in said thin film; and
- a fifth step of subjecting, after removal of said mask, said sacrificial layer to wet etching treatment using a specific etchant with said opening formed in said thin film taken as a start point of etching and said surface reformed layer taken as an end point of etching, to selectively dissolve only said sacrificial layer, thereby forming a fine structure on said plastic substrate.

21. An etching method according to claim 20, wherein said first step is carried out by generating a plasma containing implantation ions in a vacuum chamber, and attracting said plasma to said plastic substrate placed in said vacuum chamber, thereby implanting the implantation ions in said plastic substrate.

22. An etching method according to claim 20, wherein said fine structure is a beam structure having a beam portion.

23. An etching method according to claim 20, wherein a solution, which can dissolve said sacrifical layer but cannot dissolve said surface reformed layer and said thin film, is used as said etchant.

24. An etching method according to claim 20, wherein a solution, which has a high selection ratio of etching of said sacrificial layer to etching of said surface reformed layer and said thin film, is used as said etchant.

25. An etching method according to claim 20, wherein said thin film is a carbon thin film, said sacrificial layer is a copper film, and said etchant is a ferric chloride solution.

26. An etching method according to claim 20, wherein said fifth step is carried out in an ultrasonic environment.

* * * * *